G. W. CHERRY.
SAW OR BLADE FOR SAWING STONE.
No. 11,410.  Patented Aug. 1, 1854.
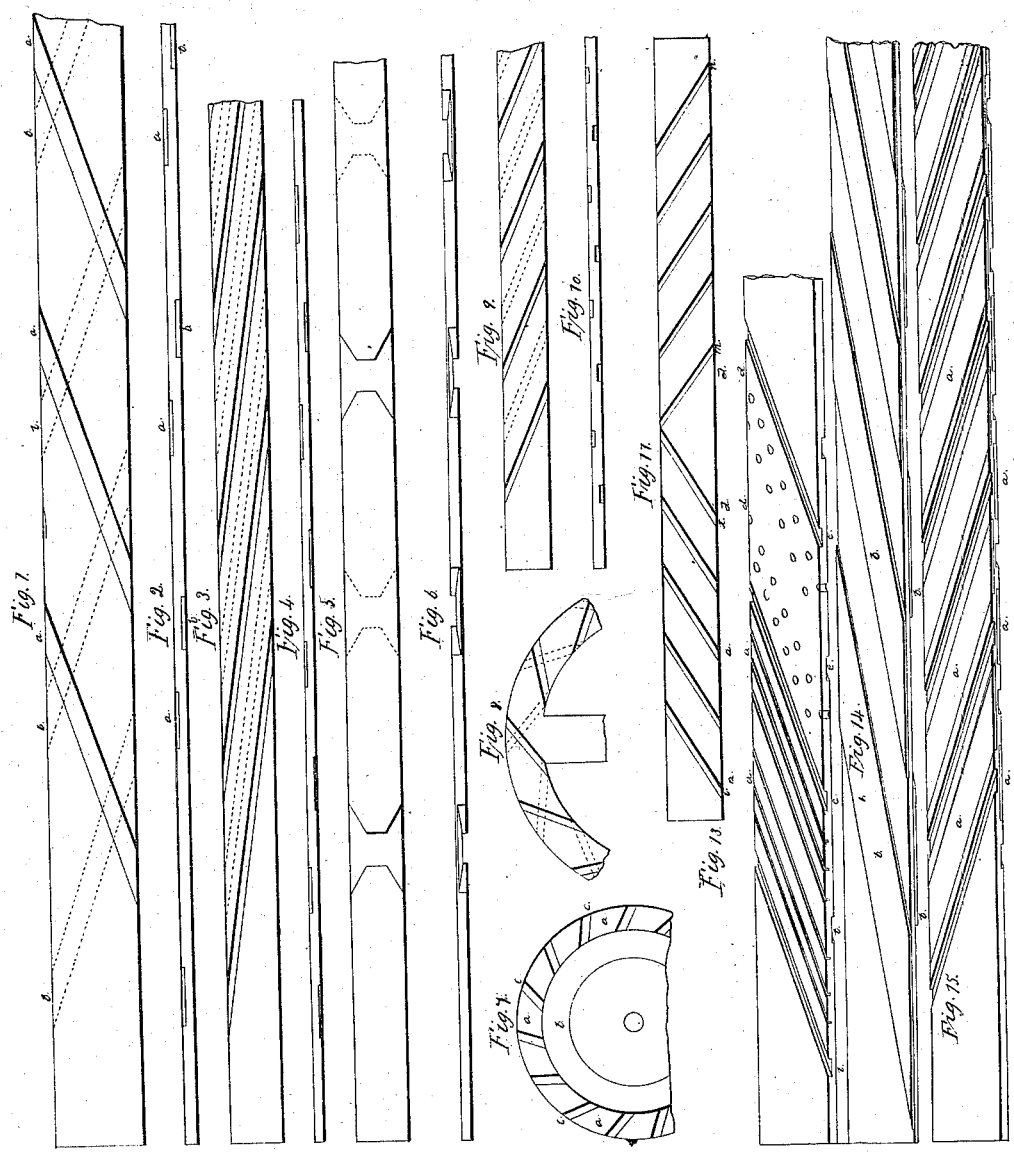

UNITED STATES PATENT OFFICE.

G. W. CHERRY, OF NEW YORK, N. Y.

STONE-SAW.

Specification of Letters Patent No. 11,410, dated August 1, 1854.

*To all whom it may concern:*

Be it known that I, GEORGE W. CHERRY, of the city, county, and State of New York, have invented certain new and useful Improvements in Saws or Blades for Sawing or Cutting Stone, of which the following is a full, clear, and exact description, reference being had to the accompanying drawings, making part of this specification, in which—

Figure 1 is a side elevation of a reciprocating saw on my improved plan. Fig. 2 is an edge view thereof. Fig. 3 is a side view of a modification. Fig. 4 is an edge view of Fig. 3. Fig. 5 is a side view of a blade with vertical grooves introduced for illustration. Fig. 6 is an edge view of Fig. 5. Figs. 7 and 8 are face views of my improvements as applied to circular saws. Figs. 9, 10, 11, 13, 14 and 15 are drawings of other modification of my improvement.

The nature of my improvements is, first, constructing saws or blades for sawing or cutting stone with inclined side grooves extending from the upper to the lower edge of the saw in the manner and for the purposes hereafter described. Second. The use of fine grooved depressions or holes made in the blades between the sand grooves for the purpose of giving uniform flexibility to the blade in the manner hereafter described. Third. The constructing of saws or blades for sawing stone alternately of hard and soft metal, in the direction of their length in the manner hereafter described.

Among the difficulties which have been experienced in sawing stone is that of getting the sand under the edge of the saw or blade. The mode known and practised is to lift up the ends of the saw alternately to admit the sand to pass down under its edge. Another difficulty is to get the waste of the stone and the broken sand out from the track of the saw, that it may not be choked and that its lower edge may have only the fresh sand between it and the stone. When the saw is lifted to let down the sand the water that passes with it under the saw serves to wash the waste out from its track below, and the lifting of the saw is as necessary for the washing away of the waste as for the introduction of the fresh sand. A third difficulty is to get the sand under the edge of the saw in as unbroken a state as practicable. The mode now practised is for the sand to wear passages for itself in the stone on the sides of the saw and on this account it is much broken before it passes under the saw and much more power is required to run the saw than would otherwise be necessary.

The chief objects of my invention are, 1st to insure the required supply of fresh sand under the saw, 2nd to insure a regular and sufficient discharge of the débris of the stone, and the broken sand from the track of the saw, and 3d to prevent the grains of sand from being broken before they pass under the saw. And the 1st part of my invention by which I propose to accomplish these several objects, consists in grooving the sides of the saw from the upper to the lower edge, so as to form channels for the sand to pass down to and under the lower edge of the saw, and in which the broken sand may be borne up and outward as the motion of the saw is reversed. That the sand may descend most readily and be saved from being caught by and broken over the sides of the grooves, it is necessary that these channels be formed obliquely across the plates; and it is desirable that their inclination to the edges of the saw be so adapted to its speed that the fall of the grains of sand in them may be nearly downward during each alternate motion of the blade. The inclination of the said grooves that serves the purpose well, is sufficient for the preservation of the strength of the saw and is best adapted also to conduct the unbroken sand under the edge of the saw when it is moving in one direction and to the bearing of the broken sand up and outward and when the motion is reversed.

The mode of making saws for cutting stone with side grooves so inclined as not to affect materially the strength of the blade, and the mode of passing whole sand to the bottom of the cut or track of the saw by grooved passages so inclined as to guard the grains from being broken over their edges; the mode of feeding whole sand from under the upper side of grooves so inclined that the grains may pass readily under the saw; and the mode of bearing up and outward the broken sand from the track of the saw upon the lower sides of grooves suitably inclined therefor, so that the feeding and discharging of the sand may be effected more perfectly and without the expenditure of the power usually required therefor, constitute the principal features of my invention as embraced in my first claim.

Figs. 1 and 2 represent one of the modes of application of my invention to a straight reciprocating saw, where it will be seen that a series of grooves $a\ a$, and $b\ b$ is formed on each side to a sufficient depth to form channels for the free passage of sand. These grooves are parallel to each other, and run obliquely from the upper to the lower edge, their obliquity being reversed on the opposite sides, as represented by dotted lines. As the saw moves in one direction, the grains of sand will readily run or fall down in the grooves and pass under the saw on one side and on the return motion do likewise on the other side. Or the said grooves may be made parallel on both sides and in that event the grooves on one side are made opposite the spaces between the grooves on the other side, as represented in Figs. 3 and 4. Or the grooves may extend from the central part toward the ends of the saw, as shown in Fig. 11. In this form while moving to the right the heavy sand passes under the saw from $k$ to $l$, while the broken or lighter sand from $m$ to $n$ is borne forward to be discharged and the reverse takes place when the motion is from right to left.

When the direction of the grooves is reversed on the opposite sides of the saw, the fresh or heavier sand passes from them and under the saw on one side, while the lighter or broken sand and the débris rises in and is borne forward to be discharged by the grooves on the opposite side.

When the grooves are in the same direction on opposite sides of the blade from end to end, the fresh sand passes chiefly down them, and from them under the saw while it is moving in one direction, and the broken sand is discharged chiefly by the opposite motion.

Reciprocating groove saws may be formed also for circular work—the saw being in the form of an arc of a circle, and suspended from a movable point at the center of the circle of which it is an arc. When the circle is large the saw answers for common work, and is easily kept in contact with the stone. Fig. 8 represents a grooved blade of that description.

Workers in marble use a small plate of sufficient thickness to be held conveniently in the hand and in the lower part of which are vertical grooves. It is about a foot in length and is used in cutting shallow channels for panels and other ornamental work.

For deep sawing the grooves in this plate are inadequate in two respects; first in being vertical and second in being formed only in the lower part of the plate. If the vertical grooves extended to the upper edge of the plate, and it were of desirable length, and thickness, it would still remain valueless for making deep cuts, as required in sawing stone into separate parts. To show this and illustrate by contrast the true character of my invention I introduce at Figs. 5 and 6, drawings of a saw with vertical grooves of the most favorable form.

In running a saw of this kind it would be found that the grains of sand would be broken over the edges of the grooves; that the sand passes from the grooves, and under the saw but imperfectly, and that the sand being borne alternately, and equally in opposite directions, would be retained in the grooves, prevent the fresh sand from passing down and choke and wear away the central part of the saw, which would soon be broken into fragments. To discharge the waste sand from such a saw would require as great an expenditure of power in lifting it, as is now expended in lifting the old saw to which it would be very inferior.

Grooves may be formed in the body of a circular saw, solely for the purpose of passing the sand to its operating edge, as shown in Fig. 7, in which the body of the saw is marked $a, a, a$, and is connected with the center by the channel $b$, into which the sand and water fall and from which they flow out through the grooves $c, c, c$, which are formed obliquely across the body of the saw.

When the grooves are formed only on one side as in this figure, the saw is run obliquely with the grooves on the upper side, that the sand may pass out from the channels, and more readily find its way under the saw.

When the grooves in straight saws are far apart the saw is the more liable to be broken, for want of an uniform flexibility and the lower edge is less uneven, to obviate these difficulties I use as represented in Fig. 13 a series of grooves too narrow for the passage of sand which are placed between the sand grooves $b\ b$ and $c$ and in which at $d, d,$ are shown depressions or holes between the sand grooves $c\ c$ and $e$. These depressions, holes or fine grooves, placed between the sand passages, serve to give an uniform flexibility to the saw and always present a desirable roughness on the operating edge of the saw, as it is gradually worn away.

As in sawing stone, soft metal holds the sand most effectually to its work, and hard metal is best for retaining the shape of the blade, I have combined them by making grooves in an iron plate, alternately broad and narrow, and soldering soft metal in the broad grooves, so that the narrow grooves and their sides of iron alternate with the soft metal in the direction of the length of the blade as represented at Fig. 15 in which $a, a, a,$ are the parts of soft metal.

Having thus fully described my improve- ments I wish it to be distinctly understood that I do not claim generally making saw plates for cutting stone with channels at the sides, as vertical channels or grooves are not new, but

What I claim as my invention and desire to secure by Letters Patent is—

1. Constructing saws or blades for sawing or cutting stone with inclined side grooves extending entirely across the body of the saw or blade, substantially as and for the purposes specified.

2. The use of fine grooves depressions or holes made in the saws or blades, between the sand passages substantially in the manner and for the purposes specified.

3. Constructing saws or blades for sawing or cutting stone alternately of hard and soft metal in the direction of their length substantially in the manner and for the purposes described.

In testimony whereof I have hereunto subscribed my name before two subscribing witnesses.

G. W. CHERRY.

Witnesses:
 IRANEUS TURNER,
 WM. C. STORRS.